May 11, 1926.                    1,583,833
R. R. HOWELL
CHUTE
Filed May 19, 1924

INVENTOR
ROBERT R. HOWELL
By Paul, Paul & Moore
ATTORNEYS

Patented May 11, 1926.

1,583,833

UNITED STATES PATENT OFFICE.

ROBERT R. HOWELL, OF MINNEAPOLIS, MINNESOTA.

CHUTE.

Application filed May 19, 1924. Serial No. 714,429.

This invention relates to new and useful improvements in chutes particularly adapted for use to convey small articles such as potatoes, and the like, from an upper to a lower floor or bin, and more particularly relates to such chutes which, when open, will be zigzagged in form. This novel apparatus comprises a hopper and a plurality of similar sections pivotally connected together and provided with suitable stops whereby when the chute is in open operative position, the sections will assume angular positions in opposed relation to one another in a zigzagging manner. The angle of each section, when thus positioned, is such as to deflect and retard the downward travel of the potatoes or other articles being passed through the chute to a lower level, thereby eliminating any danger of bruising the potatoes, when being thus conveyed from one floor or bin to the next. The chute is provided with means whereby it may be suspended from an opening in a floor or bin and depend therefrom to the receiving means. It is also adapted to be folded, and is so arranged that as the bin fills, the lower sections may be successively folded and raised so as to reduce to a minimum the distance between the discharge end of the chute and the potatoes or articles in the bin, thereby avoiding any sudden drop of the potatoes.

The object of this invention therefore is to provide an improved chute of simple and inexpensive construction.

A further and more specific object is to provide such an apparatus of the class described having a plurality of sections which may quickly and conveniently be opened to operable angular position, and which sections may be successively folded from the bottom while the chute is in operation.

Other objects of this invention will appear from the following detailed description and the accompanying drawings and will be pointed out in the annexed claims.

In the drawings, there has been disclosed a structure designed to carry out the various objects of the invention but it is to be understood that the invention is not confined to the exact features shown as various changes may be made within the scope of the claims which follow.

Figure 2:
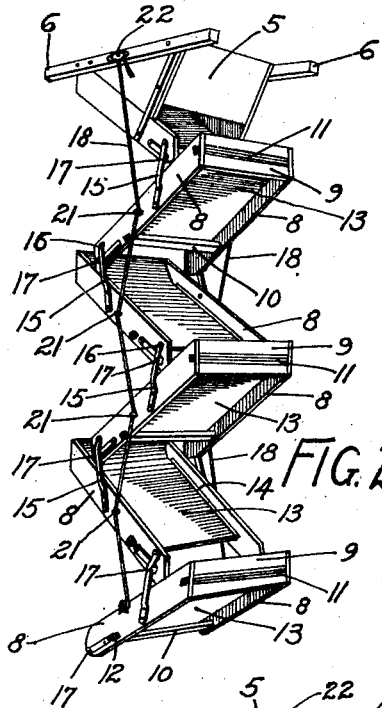
Figure 2 is a perspective view of the chute also showing it open.
Figure 1:
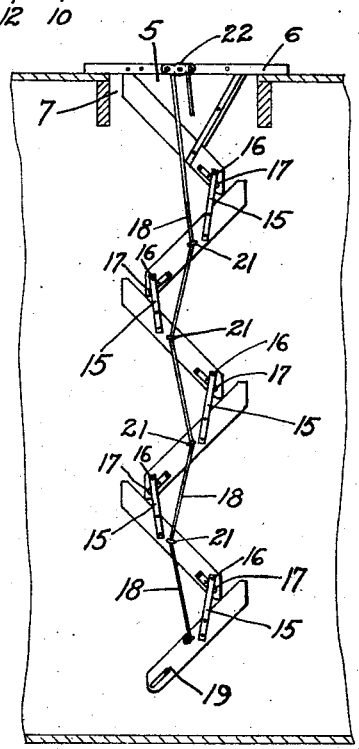
Figure 1 is a side elevation of the improved chute in open position.

In the selected embodiment of the invention here shown there is illustrated a chute comprising a hopper 5 having a pair of supporting bars 6 secured to the upper end thereof adapted to straddle an opening 7 in a floor or bin to provide a support therefor, as shown in Figure 1. The chute preferably consists of a plurality of sections pivotally connected together so that they may be opened to the position shown in Figures 1 and 2. Each section preferably comprises opposed side members 8 arranged in spaced parallel relation and secured together by means of a pair of cross members 9 and 10 interposed therebetween. Suitable tie-rods or bolts 11 are preferably passed through the side members and cross members and terminally threaded to receive in threaded engagement thereon, nuts 12 whereby such side members and cross bars may be securely tied together.

Figure 4:
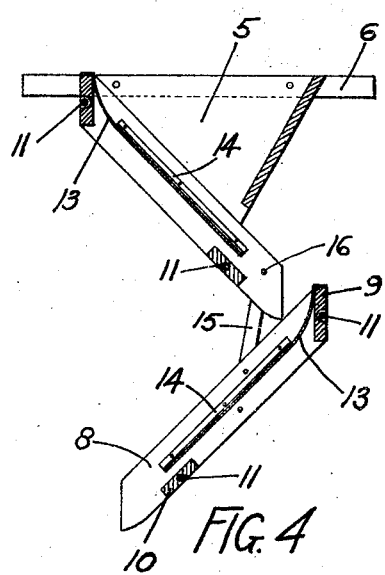
Figure 4 is a sectional view of the hopper at the upper end of the chute and one of the sections thereof.

The carrying portion of each section consists of a web 13 of flexible material such as canvas which is secured to the side members by means of suitable straps 14, the upper edge thereof preferably being secured to the upper cross member 9 as particularly shown in Figure 4. The means provided for pivotally connecting the sections together, consists of metallic straps 15 having their lower ends secured to the side members 8 and having their upper end pivotally connected to the adjacent sections by means of the pivot pins 16. Stop lugs 17 are provided on each section adapted to be engaged by the straps 15 when the sections are in open angular position as clearly shown in Figures 1 and 2.

Means are also provided whereby the sections may be conveniently folded to increase or decrease the effective length of the chute. Such means preferably consists in the provision of a cord or rope 18 on each side of the chute having thin lower ends secured to the lowermost section 19. A loop 21 is provided on each side of each section through which the ropes are passed as shown in the drawings. These loops function to guide the rope as the chute is folded and unfolded.

Figure 3:
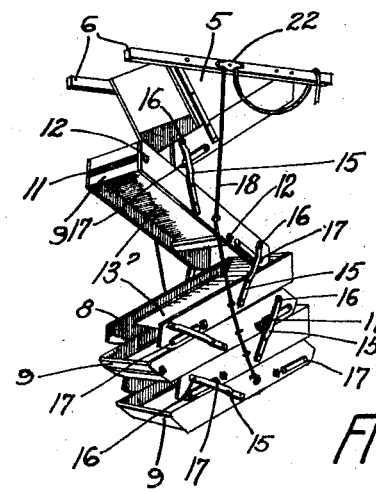
Figure 3 is a perspective view showing the chute partially folded.

The upper end of each rope preferably passes through a suitable locking means such as the self-locking pulleys 22. These pulleys may be conveniently secured to the supporting bars 6 of the hopper at a point where the ropes may be conveniently reached. Thus when it is desired to adjust the length of the chute, the free ends of the two ropes will be released from the self-locking pulleys 22 and the rope either pulled upwardly or released, depending upon whether the chute is to be decreased or increased in length. By means of the rope 18, the sections of the chute may be conveniently and completely folded against the bottom of the hopper, or, if desired, they may be partially folded as shown in Figure 3.

In the drawings, it will be noted that when the sections are opened to operable angular position, the sections will be arranged in opposed relation to one another in a zigzagging manner. Therefore, when the potatoes or other articles are passed through the chute from an upper floor or bin to a receiving means therebelow, they will be first delivered into the hopper 5 at the upper end of the chute from which they will be discharged onto the adjacent section and so on down through each successive section. It will therefore be seen that as a result of the angular position of the carrying surface 13 of each section, the travel of the potatoes will be retarded to the extent that there will be no danger of bruising or injuring them in passing them from an upper floor to a lower floor or bin.

I claim as my invention:

1. A chute comprising a plurality of sections, one section being hinged at its discharge end to the receiving end of the next section for forming oppositely inclined sections when in delivering position, and means for lifting the sections successively from the lower end of the chute upwardly to shorten the length of the chute.

2. A chute comprising a plurality of sections, one section being hinged at its discharge end to the receiving end of the next section for forming oppositely inclined sections when in delivering position and arranged for one section to be folded against the next section while the chute is in delivering position to shorten the length of the chute, and means for lifting the sections to successively fold one against the other while in delivering position.

3. A chute comprising a plurality of sections, one section being hinged at its discharge end to the receiving end of the next section for forming oppositely inclined sections when in delivering position, means on one section coacting with the hinge of two sections to limit the inclination of the section to a predetermined angle, and means for lifting the sections successively to fold one upon the other to shorten the length of the chute.

4. A chute comprising a plurality of sections, one section being hinged at its discharge end to the receiving end of the next section for forming oppositely inclined sections when in delivering position, means for lifting the sections successively one into folded position against the next upper section to vary the effective delivery length of the chute, and means for securing the sections in their changed points of delivery.

In witness whereof, I have hereunto set my hand this 8th day of May, 1924.

ROBERT R. HOWELL.